United States Patent Office 3,128,281
Patented Apr. 7, 1964

3,128,281
AMINE OXIDES
John R. Dice and Roger D. Westland, Ann Arbor, Mich.,
assignors to Parke, Davis & Company, Detroit, Mich.,
a corporation of Michigan
No Drawing. Filed Aug. 14, 1961, Ser. No. 131,095
3 Claims. (Cl. 260—297)

This invention relates to pyridine-N-oxide compounds and to methods for their production. In particular, the invention is concerned with novel pyridine-N-oxide compounds of the formula

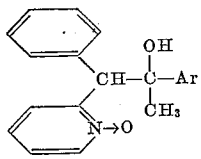

where Ar can represent a phenyl radical or a 3-methoxyphenyl radical.

The compounds of the invention can be produced by reacting a pyridine derivative of the formula

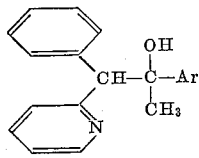

with a peroxy compound; where Ar is as defined before. Peroxy compounds suitable for use in this process include hydrogen peroxide, peralkanoic acids such as performic acid and peracetic acid, peroxy acids of the aromatic series such as perbenzoic acid and perphthalic acid, inorganic peroxy acids such as monopersulfuric acid, and other organic and inorganic peroxidic reagents. The preferred peroxy compound is peracetic acid. The process is usually carried out at a temperature between −10 and +100° C., although the rate of reaction is satisfactory at room temperature and neither heating nor cooling is necessary. When cooling is used, the temperature is maintained above the freezing point of the reaction mixture. At least one equivalent and usually an excess of the peroxy compound is used. The reaction is preferably conducted in an unreactive solvent such as chloroform, ethylene dichloride, acetic acid or propionic acid. Depending upon the specific peroxy compound and reaction temperature, the time required for substantially complete conversion to the N-oxide varies from several minutes to a few days.

The pyridine compounds employed as starting materials in the foregoing processes can be prepared by the reaction of an aryl methyl ketone of the formula Ar—COCH₃ with an alkali metal derivative of 2-benzylpyridine under anhydrous conditions followed by hydrolysis of the resulting reaction product; where Ar is as defined before.

The products of the invention have useful pharmacological properties. They are hypocholesteremic agents which cause a fall in blood chloesterol with minimal estrogenic side effects. They are active upon oral administration. The favorable ratio of hypocholesteremic to estrogenic activity shown by these compounds is unexpected because in compounds of similar structure but having a different Ar group, the conversion of the amine to the amine oxide usually causes a fall in hypocholesteremic activity while leaving estrogenic activity unaffected. The oxides of the foregoing structural formula exist in diastereoisomeric forms. Where Ar is phenyl, the preferred diastereoisomer is the one of melting point 151–154° C. Where Ar is 3-methoxyphenyl, the preferred diastereoisomer is the one of melting point 156–157° C.

The invention is illustrated by the following examples.

Example 1

A solution is prepared by warming 4.9 g. of 1-(2-pyridyl)-1-phenyl-2-(3-methoxyphenyl)-propan-2-ol (isomer melting at about 97–98° C.) with 4.4 ml. of chloroform and 4.4 ml. of 40% peracetic acid in glacial acetic acid. An additional 3 ml. of glacial acetic acid is added and the solution allowed to stand overnight at room temperature. The solution is then added to 100 ml. of ice water and 50% sodium hydroxide solution is added dropwise until the mixture is strongly alkaline. The oil which separates is extracted with chloroform and the chloroform solution is washed with water, dried over magnesium sulfate and evaporated in vacuo, preferably in the presence of a platinum wire to destroy peroxides. The residual product is 1-(2-pyridyl)-1-phenyl-2-(3-methoxyphenyl)-propan-2-ol-N-oxide; M.P. 156–157° C., after purification by crystallizations from chloroform-ether.

Another diastereoisomer of 1-(2-pyridyl)-1-phenyl-2-(3-methoxyphenyl)-propan-2-ol-N-oxide is obtained by substituting 4.9 g. of the isomeric 1-(2-pyridyl)-1-phenyl-2-(3-methoxyphenyl)-propan-2-ol of M.P. about 121-123° C. in the foregoing procedure.

The starting materials can be obtained as follows. A solution of phenyllithium is prepared by adding 52 g. of bromobenzene in 500 ml. of ether to a stirred suspension of 3.5 g. of lithium in 200 ml. of ether and heating the mixture under reflux for one hour after addition is complete. A solution of 42.5 g. of 2-benzylpyridine in 150 ml. of ether is then added and the mixture is heated under reflux for one hour. 37.5 g. of 3-methoxyacetophenone is slowly added and after the addition is complete, the mixture is heated under reflux for two more hours and then stirred with 300 ml. of water. The ether phase is separated, combined with an ether extract of the aqueous phase, dried over magnesium sulfate and concentrated almost to dryness to give a residue of 1-(2-pyridyl)-1-phenyl-2-(3-methoxyphenyl)-propan-2-ol which is washed with heptane and collected. The higher melting diastereoisomer, M.P. 121-123° C., is obtained by two crystallizations from ethanol. The lower melting diastereoisomer, M.P. 97–98° C., is obtained from the first ethanol crystallization liquor by concentrating it to obtain a second crystalline crop and then recrystallizing this product twice from heptane and once from cyclohexane.

Example 2

85 ml. of 40% peracetic acid in glacial acetic acid is added to a solution of 100 g. of 1-(2-pyridyl)-1,2-diphenylpropan-2-ol (isomer melting at about 133–135° C.) in 300 ml. of glacial acetic acid. The mixture is stirred and warm until solution is complete and then allowed to stand at room temperature for three days. The reaction mixture is then diluted with ice water and extracted with a total of 1500 ml. of chloroform in several portions. The combined chloroform extract is washed twice with dilute sodium hydroxide solution, with water, and then dried over magnesium sulfate and filtered. The filtrate is concentrated to a volume of about 300 ml. and then diluted with 600 ml. of ether. A crystalline product consisting of 1-(2-pyridyl)-1,2-diphenylpropane-2-ol-N-oxide separates and is collected; M.P. 152–154° C.

Another diastereoisomer of 1-(2-pyridyl)-1,2-diphenylpropan-2-ol-N-oxide, M.P. 148° C., is obtained by substituting 100 g. of the isomeric 1-(2-pyridyl)-1,2-diphenylpropan-2-ol of M.P. about 107–108° C. in the foregoing procedure.

The starting materials can be obtained as follows. A stirred solution of phenyllithium prepared from 2.5 g. of lithium and 26 g. of bromobenzene in 250 ml. of ether is treated by the addition of 28 g. of 2-benzylpyridine in 100 ml. of ether added over a five minute period. The reaction mixture is maintained under reflux during the addition, and stirring and heating under reflux are continued for one more hour. A solution of 18 g. of acetophenone in 100 ml. of ether is then added and stirring is continued for two more hours at room temperature. The mixture is stirred with 300 ml. of water and the ether and aqueous phases are separated. The ether phase is combined with two ether extracts of the aqueous phase and the combined ether solution is washed twice with water, dried over magnesium sulfate, filtered and evaporated to a small volume. The crystalline product which separates is collected and recrystallized twice from 95% ethanol and then from ethyl acetate; 1-(2-pyridyl)-1,2-diphenylpropan-2-ol; M.P. about 133–135° C. The lower melting diastereoisomer, M.P. 107–108° C., is obtained by carrying out fractional crystallizations on the crystallization liquor.

We claim:
1. A compound of the formula

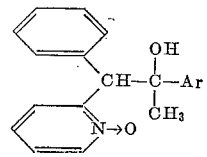

where Ar is a member of the class consisting of phenyl and 3-methoxyphenyl.
2. 1-(2-pyridyl)-1,2-diphenylpropan-2-ol-N-oxide.
3. 1-(2-pyridyl)-1-phenyl-2-(3 - methoxyphenyl) -propan-2-ol-N-oxide.

References Cited in the file of this patent
UNITED STATES PATENTS
2,966,493    Allen et al. _____ Dec. 27, 1960

OTHER REFERENCES

Culvenor: Reviews of Pure and Applied Chemistry, vol. 3, No. 2, pp. 83–105 (1953).

Profft et al.: Chemische Berichte, vol. 93, pp. 2591–2604 (1960).